July 7, 1964  J. H. GENGELBACH  3,140,064
LIQUID HEAT SINK AUXILIARY POWER GENERATOR FOR SPACE VEHICLES
Filed July 22, 1963
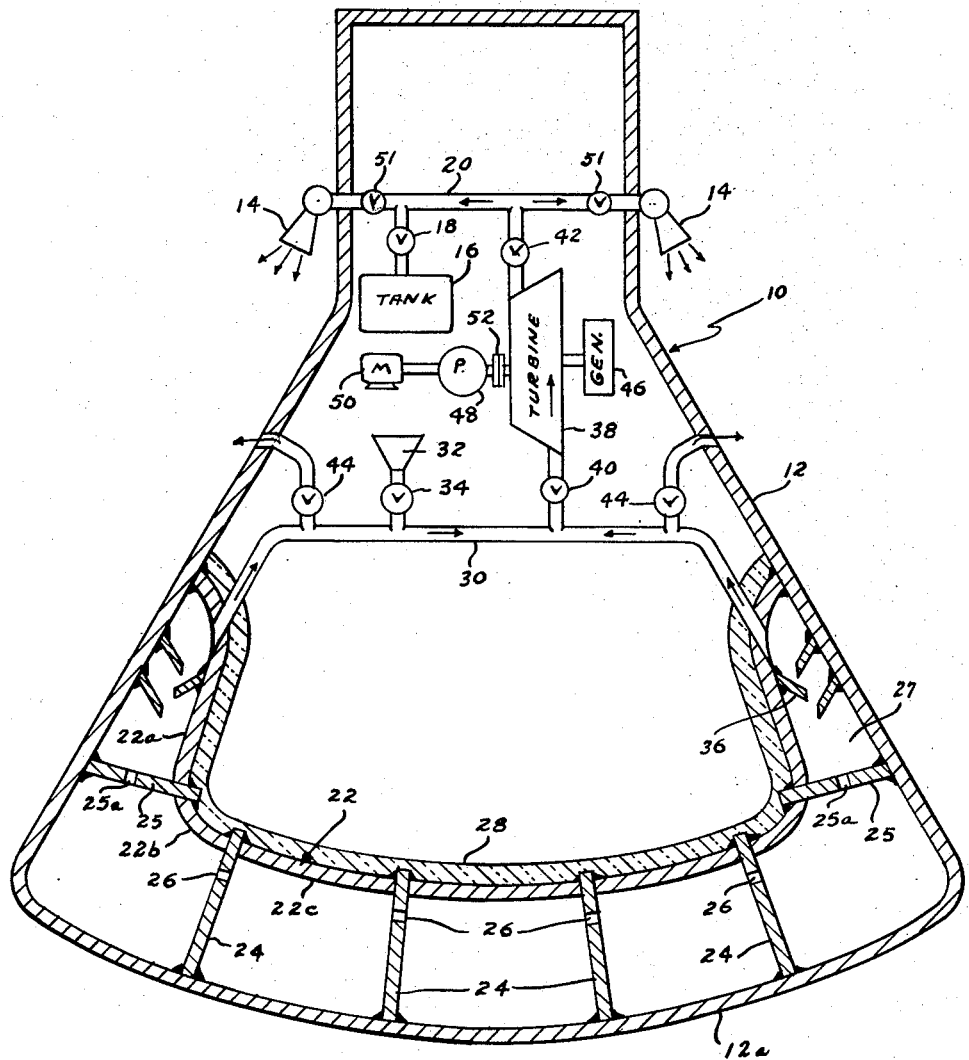
INVENTOR.
JOACHIM H. GENGELBACH
BY
ATTORNEY

United States Patent Office 3,140,064
Patented July 7, 1964

3,140,064
LIQUID HEAT SINK AUXILIARY POWER GENERATOR FOR SPACE VEHICLES
Joachim H. Gengelbach, 1615 Rosalia Lane,
Alamogordo, N. Mex.
Filed July 22, 1963, Ser. No. 296,872
1 Claim. (Cl. 244—1)
(Granted under Title 35, U.S. Code (1952), sec. 266)

The invention described herein may be manufactured and used by or for the Government for governmental purposes without the payment to me of any royalty thereon.

The invention relates to space vehicles of both the manned and unmanned types. More specifically, it relates to a re-entry heat sink adapted to provide an auxiliary power source during re-entry; thus reducing the size and weight of power packs which would otherwise be carried aloft.

It is well known that space craft, on making re-entry into the earth's atmosphere, go through an extremely critical phase of operation. The heat generated by air friction, as the high speed craft enters the denser air, is so great that defensive measures must be taken to prevent destruction of the craft. Also during re-entry, the craft is going through a period of transition which requires an above average expenditure of power by the power consuming control devices on the craft.

Various schemes, in addition to proper aerodynamic shapes, have been proposed and used to combat the heat generated by re-entry. For example, nose cones have been made of the best available heat resistant metals and ceramics, as well as by using ablatable coatings to absorb the severe heat.

One object of the present invention is to provide a heat sink on a re-entry space craft which will provide a source of energy for driving auxiliary power generators.

Another object of the present invention is to provide a source of space vehicle generated power to augment the power packs carried aloft.

A further object of the invention is to convert the absorbed heat of re-entry into useful power.

Yet another object of this invention is to reduce the size and weight of the power packs which must be carried aloft in a space vehicle.

Additional objects, advantages and features of the invention reside in the construction, arrangement and combination of parts involved in the embodiment of the invention as will appear from the following description and accompanying drawing which is a sectional schematic showing the arrangement and relationship of components.

Space vehicle 10 may be any re-entry vehicle; as for example, the Mercury or Gemini capsule. The capsule has an outer shell 12 supporting a plurality of attitude control nozzles 14 which may be either fixed or swivel nozzles in accordance with the requirements of the particular control system not constituting a portion of the present invention. Contained within the capsule is a source of gaseous energy for discharge through the nozzles 14, such as tank 16. The gas within tank 16 passes through control valve 18 and into nozzle manifold 20 from whence it is fed into the inlet end of the nozzles via appropriate attitude control valves 51.

A closed pressure veessel or boiler is built into the re-entry end of the vehicle. Disposed rearward from the re-entry end 12a of the capsule is a partitioning member 22 which is circumferentially joined to the outer shell 12 to form the rear wall of the pressure vessel. The partitioning member may be formed of a series of contoured plates such as 22a, 22b and 22c which are continuously welded to the inside of outer shell 12 and anti-surge baffle plates 24. The baffle plates are preferably of elongated form to prevent sloshing of liquid within the pressure vessel. Each baffle plate 24 contains one or more passages, such as holes 26 passing therethrough, for communication between the chambers formed between adjacent baffle plates and for the passage of vapor or gas. A divider member 25, which may have the general configuration of a flat ring structure may likewise be welded between the inside of the outer shell 12 and the partitioning member 22 to divide the pressure vessels into two portions or sections; a gas or vapor section 27 which is differentiated from the balance of the pressuree vessel which constitutes the liquid section of the boiler. The divider member 25 contains one or more passages, such as hole 25a passing therethrough, which permit the vapor gas generated from the liquid to pass into the gas section 27. Contained within the gas section of the pressure vessel are a plurality of suitably spaced baffles 36, such as are well known to the art and which are used for the separation of any liquid from the vapor or gas flowing from the pressure vessel. An insulating blanket 28 is provided to insulate the interior of the capsule from the heat within the pressure vessel so formed.

The structure and fabrication method, for the pressure vessel disclosed, is one which presumes the outer shell of the capsule has been completely fabricated and that all further construction may take place only on the inside of the capsule. It is therefore obvious that the size of all additional sub-combinations are limited by the openings in the capsule. It is evident that other construction methods may be used; as for example; the partitioning member 22 of the pressure vessel may be formed of a single plate and located before the re-entry end of the capsule is installed.

Joined to the gas section of the pressure vessel is a header manifold 30, which may take any desired form, but which for convenience and structural support is shown bridged across the pressure vessel. Joined to the header manifold is a filler 32 for the introduction of a suitable fluid into the pressure vessel through manual control valve 34.

As the capsule makes re-entry, heat is absorbed by the re-entry end 12a and the liquid within the pressure vessel is converted to high pressure vapor or gas in the same manner that a conventional boiler converts water into steam. The vapor is introduced into an energy convertor, such as turbine 38, through control valve 40 and discharged from the turbine into nozzle manifold 20 through check valve 42. The discharged vapor from the turbine is discharged through the attitude control nozzles 14. Check valve 42 prevents back flow into the turbine when the nozzles are powered by the gas contained within tank 16 and at any other time when the downstream pressure on the turbine exceeds the upstream pressure. One or more relief valves 44 are provided for controlling the maximum allowable vapor pressure within manifold 30. It would be preferable to use the relief valves 44 in balanced pairs symmetrically discharging on the periphery of the craft in order to have the thrust of one valve neutralizing the thrust from the other; or in the alternative, to discharge in a manner tending to reduce the re-entry velocity of the craft.

Turbine 38 may be used to drive either a generator 46, a hydraulic pump 48, or both, as shown on the drawing. The generator may be connected through suitable controls to the regular electrical power supply of the capsule. The electrical power supply (which may be batteries and solar cells) and controls, which do not constitute a part of this invention, are well known to the art and are therefore not shown. Likewise, the hydraulic system, of which pump 48 is a conventional component, is not shown since it is well known to the art and does not constitute a portion of the present invention. The pump 48 may be connected to the turbine through an overrunning clutch 52 and may be normally driven by an electric motor 50 connected to the electrical power supply. Thus, the pump will be driven by the motor until such time as the turbine speed and power output exceeds that of the motor, at which time the turbine will drive the pump. Provision may be made to either disconnect the electrical input to the motor when the turbine reaches a certain r.p.m., or to let the motor be driven as a generator.

A certain amount of power is required periodically to control the capsule when it is in orbit. Much greater control forces with a greatly increased power input are required during re-entry. This additional energy may be supplied by the liquid contained within the pressure chamber during re-entry. It is thus seen that the liquid not only provides a necessary heat sink for the protection of the craft but also provides an auxiliary power source at the very time it is needed.

Any suitable liquid which meets environmental requirements may be used. Water is suitable for some applications. On other applications, a metal such as mercury or sodium may be used.

On most missions, the forces of acceleration and deceleration will keep the liquids within the pressure vessel and out of the manifold 30. On those missions where this is not always true, valve 40 may include a manual/command over-ride to prevent any liquid from entering the turbine.

It is to be understood that the embodiment of the present invention as shown and described is to be regarded as illustrative only and that the invention is susceptible to variations, modifications and changes within the scope of the appended claim.

I claim:

In a re-entry space vehicle having a plurality of attitude control nozzles, an auxiliary heat sink power generator utilizing the heat generated on re-entry of the vehicle into the earth's atmosphere to vaporize a liquid and supply gaseous energy to nozzles, turbines and the like, and comprising: a boiler in the re-entry end of said vehicle, said boiler being formed of a partitioning member circumferentially joined to the outer shell of said vehicle rearward from the re-entry end of said vehicle to provide a closed boiler vessel, an internal divider member having one or more passages therethrough and joined to the outer shell of said vehicle and said partitioning member in a manner dividing said boiler into a liquid section at the re-entry end and a gas section rearward from the liquid section of said boiler, a plurality of internal anti-surge baffle plates within the liquid section of said boiler, each of said baffle plates containing one or more passages therethrough and joined to the re-entry end of said vehicle and said partitioning member, and a plurality of drier baffles spaced within the gas section for the separation of any liquid from the gas flowing from said boiler; a nozzle manifold joined to the entrance end of said attitude control nozzles, a header manifold joined to the gas section of said boiler, passage means joining said header manifold to said nozzle manifold, a turbine machine interposed in said passage means, and control means in said passage means controlling the flow of gas through said turbine and into said nozzle manifold for discharge from said attitude control nozzles.

References Cited in the file of this patent

UNITED STATES PATENTS

| | | |
|---|---|---|
| 3,093,346 | Faget | June 11, 1963 |
| 3,093,348 | Schelp | June 11, 1963 |

OTHER REFERENCES

Western Aviation Magazine, September 1956, pp. 9 and 10.

Aviation Week Magazine, Oct. 12, 1959, p. 61.